US005520768A

United States Patent [19]
Crook et al.

[11] Patent Number: 5,520,768
[45] Date of Patent: May 28, 1996

[54] METHOD OF SURFACE PREPARATION OF ALUMINUM SUBSTRATES

[75] Inventors: Russell A. Crook, South Ogden; Larry W. Poulter; Kenneth J. Schulte, both of Ogden; James W. Sinclair, Logan, all of Utah

[73] Assignee: Thiokol Corporation, Ogden, Utah

[21] Appl. No.: 327,305

[22] Filed: Oct. 21, 1994

[51] Int. Cl.$^6$ .................................................. C09J 5/04
[52] U.S. Cl. ........................... 156/319; 134/26; 156/281; 427/327
[58] Field of Search .................................. 156/319, 281; 427/327; 134/26

[56] References Cited

U.S. PATENT DOCUMENTS

| | | | |
|---|---|---|---|
| 5,108,793 | 4/1992 | van Ooij et al. | 427/327 |
| 5,112,418 | 5/1992 | Pike | 156/319 |
| 5,200,275 | 4/1993 | van Ooij et al. | 428/623 |
| 5,221,371 | 6/1993 | Miller | 148/273 |
| 5,238,518 | 8/1993 | Okubi et al. | 156/326 |
| 5,326,594 | 7/1994 | Sabata et al. | 427/327 |

Primary Examiner—John J. Gallagher
Attorney, Agent, or Firm—Madson & Metcalf; Ronald L. Lyons

[57] ABSTRACT

A surface preparation process has been developed for aluminum and aluminum alloy substrates that greatly improves the resulting bond. The process improves bond strength, fracture toughness, durability and failure mode of adhesive bonds. The process also decreases the sensitivity of aluminum substrates to processing variables such as humidity, temperature and hence the processing timelines. The process involves treating an aluminum surface with a solution of an alkali metal metasilicate, and subsequently treating the surface with a solution of an organofunctional silane. Employing this two step process, bonding to the aluminum substrate is improved.

29 Claims, No Drawings

METHOD OF SURFACE PREPARATION OF ALUMINUM SUBSTRATES

BACKGROUND

1. The Field of the Invention

The present invention is related to surface cleaning and preparation of aluminum or other metal substrates in order to provide improved bonding to those substrates. More particularly, the present invention is related to cleaning such metal substrates first with an aqueous silicate solution, followed by treatment with an aqueous silane rinse.

2. Technical Background

In constructing various structures from metals it is important to have the capability of bonding to metal surfaces. This includes bonding metal surfaces to other metal surfaces, as well as bonding non-metal materials to metal surfaces. In many applications it is possible to use simple mechanical bonding mechanisms, such as bolts, screws, or rivets. In other applications, concerns over the added weight of mechanical fasteners make the use of adhesive more viable. Various adhesives are known and commonly used in the art of bonding metals together or bonding non-metal materials to metals. For example, various epoxy-based adhesives are widely used for these applications.

When metals are bonded using an adhesive it is generally important to provide the strongest possible bond. In the past it was difficult to assure a strong bond when using adhesive. For example, processing conditions during bond fabrication often cause dramatic reductions in bond strength. This is particularly true when bonding to metals such as aluminum. Bonding to aluminum and aluminum alloys has presented a special challenge.

Aluminum and aluminum alloys are considered difficult metals to bond to because of the propensity of aluminum surfaces to form a weak hydrated surface layer of aluminum oxide. The surface morphology and hence, adhesive bond durability, is dependent upon the type of surface treatment received prior to bonding. This is especially true for aluminum adherends because of the potential to form mechanically weak hydrated forms of aluminum oxide.

The oxide generally found on aluminum is the trivalent aluminum oxide ($Al_2O_3$). This oxide is stable for bonding. However, with time and humidity, this oxide can become hydrated to form a less stable and mechanically weak layer of AlOOH (boehmite) and alumina trihydroxide (bayerite). The thickness of this layer can range from about 100 Å to about 1500 Å, depending on the environment. If an adhesive is applied over this film, a weak boundary layer is incorporated into the bond system. The presence of this weak boundary layer results in decreased bond strength, low fracture toughness, and poor bond durability over time. Similarly, it is often a problem to provide bonds which are of sufficient initial strength.

A widely used treatment for aluminum surfaces involves vapor degreasing and grit blasting. However, these methods do not prevent further growth of boehmite and bayerite layers on the aluminum surface. Therefore, the bondline properties are very sensitive to the relative humidity and process times from surface preparation to bonding. Moisture can also penetrate the bondline during aging, resulting in degradation of bondline properties and interfacial failures in the boehmite/bayerite layer.

Available cleaning solvents used in this process have become more restrictive because of environmental regulation on chemical waste disposal. Thus, the combination of process sensitivity, marginal bond durability, and environmental constraints, raises concerns over continued use of traditional surface treatment processes.

There are limited alternative methods of aluminum surface treatment and preparation. Some of these other methods of aluminum surface preparation involve formation of stable, moisture-resistant oxide layers. These methods include sulfuric, chromic, and phosphoric acid anodization. These electrolytic processes inhibit the further growth of hydroxide layers and enhance initial bond strength and bond durability. In addition, the phosphoric acid process produces a honeycomb surface which is believed to enhance bond strength through mechanical interlocking.

These processes, however, generally consist of a complex series of treatments including degreasing, alkaline cleaning, acid etching, acid anodization, and in some instances, a post treatment process including primers and coatings. These processes use heavy metals, acids, caustics and other hazardous and toxic chemicals which pose handling and disposal problems. Clearly, environmental constraints limit the usefulness of these traditional surface treatment processes.

Accordingly, what is needed in the art are effective and efficient methods of surface preparation and treatment of aluminum, and other metals, in order to provide stable adhesive bonding to metal substrates. In that regard it would be a significant advancement in the art to provide methods of surface treatment and preparation which were relatively simple, and which used readily available materials. It would be a related advancement in the art to provide such methods which employed materials that did not present a significant environmental hazard.

It would be a further advancement in the art to provide methods of surface treatment and preparation which provided increased bond strength. It would also be an advancement to provide such methods which resulted in stable bonds which did not significantly degrade over time. It would be another advancement in the art to provide such methods which resulted in bonds which were unlikely to fail.

Such methods are disclosed and claimed herein.

BRIEF SUMMARY AND OBJECTS OF THE INVENTION

The present invention relates to methods for treating aluminum and other metal substrates in order to improve bonding to such substrates. The present invention involves a two step surface treatment process. The first step of the process involves treating the metal surface with an aqueous silicate solution. The silicate solution [$(SiO_3^=)$aq] is preferably a solution of an alkali metal metasilicate. Metasilicates are desirable because of their buffering capacity. The alkali metal metasilicates may include, for example, sodium, potassium, or lithium metasilicates. Alternatively, the silicate may be provided in the form of alkaline earth metal, magnesium, calcium, strontium, barium, amine, or quaternary ammonium metasilicate, or any other solvated form of $(SiO_3^=)$aq. These materials are well known to those of skill in the art, and many of these materials are commercially available.

The second step in the process involves treatment of the surface with an aqueous silane solution. Preferred silanes include organofunctional silanes. Examples of these materials include: gamma-glycidoxypropyltrimethoxysilane; gamma-aminopropyltrimethoxysilane; gamma-methacryloxypropyltrimethoxysilane; N-[2-(vinylbenzylamino)ethyl]-3-aminopropyltrimethoxysilane; phentrimethyoxysilane; and [glycidoxy(epoxy)]polyfunctionalmethoxysilane. Silanes of this type are also well known to those of skill in the art and many are commercially available.

The silicate and silane treatment process provides aluminum surface stabilization and bond property enhancement, but with a relatively simple and environmentally compatible process. A synergistic effect is observed with the metasilicate and silane which produces a process insensitive, robust bond system.

Thus, the present invention provides effective and efficient methods of surface preparation and treatment of aluminum in order to provide stable adhesive bonding to aluminum substrates. The present invention also provides methods which result in bonds which are unlikely to fail.

The objects and advantages of the invention will become further apparent upon reading the following detailed description and appended claims.

DETAILED DESCRIPTION OF THE PREFERRED EMBODIMENTS

As discussed above, the preferred embodiments of the present invention consist of treating aluminum or other metal surfaces with a metasilicate solution which cleans and/or modifies the surface of the metal. This step is followed by applying a reactive silane rinse which further modifies the surface in preparation for bonding. Thus, the present invention provides a simple, two-step cleaning and in-situ surface preparation process for aluminum, aluminum alloy, or other metal surfaces to prepare them for bonding.

The surface is first treated with an aqueous solution of a metasilicate (or alkaline aqueous silicate), formulated in accordance with Table I. The solution comprises from about 0.05 pph (where "pph" means grams per one hundred grams of solution) to about 4 pph silicate, and from about 96.0 pph to about 99.95 pph water. While this range of concentration is presently preferred, in certain instances it may be desirable to add much more silicate to the aqueous solution. Thus, silicate solutions containing 40 pph up to the limits of solubility may be employed if desired or needed for particular applications. It will be appreciated, however, that the primary objective of this treatment is to provide a very thin silicate layer on the surface. Thus, concentrations above 4 pph are generally unnecessary, and may be counterproductive in some instances.

Optional ingredients in the solution may also include various cleaning additives, such as detergents, emulsifiers, and terpenes. The pH of the solution, with or without the optional ingredients, is generally in the range of from about 11.5 to about 12.5.

TABLE I

| CLEANER/TREATMENT SOLUTION* | |
|---|---|
| Ingredient | Preferred Concentration (pph) |
| Metasilicate | 0.05 to 4.0 |
| Water | 96.0 to 99.95 |
| Cleaning, additives (detergents, emulsifiers, terpenes, etc) | Optional |

*pH = 11.5 to 12.5

As discussed above, treatment of the metal surface with the silicate solution is followed by a rinse with an aqueous solution of an organofunctional silane coupling agent. This aqueous solution is formulated in accordance with Table II. It is presently preferred that the solution contain from about 0.24 pph to about 10.0 pph silane and from about 90.0 pph to about 99.76 pph water. Again, much higher concentrations of silane in solution may also be used. Solutions having 25 pph or more silane fall within the scope of the present invention. However, the general objective of this treatment is to provide a thin layer of silane on the surface. Thus, applying silane solutions having concentrations above 10.0 pph is generally unnecessary.

TABLE II

| REACTIVE RINSE SOLUTION | |
|---|---|
| Ingredient | Preferred Concentration (pph) |
| Organofunctional silane | 0.24 to 10.0 |
| Water | 90.0 to 99.76 |
| Acid | As Required |

The functionality of the organofunctional silane may be selected such that it is compatible with the adhesive or coating to be applied. Silanes of the type usable in the present invention include gamma-glycidoxypropyltrimethoxysilane; gamma-aminopropyltrimethoxysilane; gamma-methacryloxypropyltrimethoxysilane; N-[2-(vinylbenzylamino) ethyl]-3-aminopropyltrimethoxysilane; phentrimethyoxysilane; and [glycidoxy (epoxy)]polyfunctional methoxysilane.

It is generally necessary to hydrolyze commercial silane products. Accordingly, acetic acid, or other acceptable acids, may be added to the silane rinse solution as required for pH control and to accelerate the silane hydrolysis reaction rate. The amount and concentration of such acids is well within the knowledge of those skilled in the art, however, generally pH in the 5.0 range is acceptable.

The process of the present invention enhances the bond strength, fracture toughness, failure mode, and durability of the resulting adhesive bond. The resulting bond fracture toughness, bond strength and durability are less sensitive to process variations. Such variations may include time delays or variations, adhesive staging, relative humidity, processing temperature, and solution concentrations. The solutions used in the process may be applied by spray, dip, immersion, brush or other contact methods. The process is effective with freshly milled, grit blasted, oxidized, and hydrated aluminum surfaces.

While the present discussion has focused on bonding to aluminum surfaces, the process of the present invention is also applicable to other metals, metal alloys, adhesive types, elastomers, fiber reinforced plastics, paints, and coatings. The resulting bond is superior to that formed by conventional and electrolytic surface treatments and negates the requirement for anodization or other environmentally hazardous surface treatment and modification processes.

EXAMPLES

The following examples are given to illustrate various embodiments which have been made or may be made in accordance with the present invention. These examples are given by way of example only, and it is to be understood that the following examples are not comprehensive or exhaustive of the many types of embodiments of the present invention which can be prepared in accordance with the present invention.

Methodologies

In order to evaluate the metasilicate/silane process of the present invention, a discriminating adhesive and a sensitive, interfacial bond strength test method were selected. Dexter Hysol EA946, a rubbery epoxy adhesive, was selected because the failure mode is typically interfacial against aluminum surfaces at room temperature and hence is very sensitive to changes in surface chemistry. This material and materials like it are readily commercially available.

Fracture toughness was selected as a test method for measuring the interfacial strength of the bond system. This technique, described in ASTM D 3433, measures the energy required to propagate a crack in a bondline. It is very sensitive to surface chemistry, morphology and other surface conditions. The Mode I fracture toughness is calculated by the following equation:

$$G_{IC} = 4mP_c^2/Ew^2$$

where:

m=geometry factor (in$^{-1}$)

$P_c$=critical load for crack propagation (lb)

E=adherend modulus (psi)

w=specimen width (in)

Tapered double cantilever beams were selected as the bond specimen because fracture toughness in this configuration is independent of crack length, thereby simplifying data reduction.

These parameters were used in evaluating the present invention and in providing a comparison between conventional surface preparation methods and the present invention.

Example 1

Five ASTM D 3433 tapered double cantilever beams (TDCB) made of 7075-T73 aluminum alloy were cleaned by a conventional process of vapor degreasing with methyl cholorform and grit blasting with zirconium silicate. The 7075-T73 alloy is a standard commercially available aluminum alloy. The clean surfaces were sprayed with a 0.36 pph sodium metasilicate solution at 75° F. for approximately five minutes and rinsed with 5 pph gamma-glycidoxypropyltrimethoxysilane at 75° F. for 5 minutes. The beams were bonded with Dexter Hysol EA946 epoxy adhesive and cured for a minimum of 36 hours at 135° F.

A second group of five beams was also conventionally precleaned by vapor degreasing and grit blasting, but held for 72 hours at 80 percent relative humidity to age the surface prior to metasilicate/silane treatment and bonding.

A third set of beams was conventionally precleaned, held for 72 hours at 80% relative humidity ("R.H.") and bonded without receiving any metasilicate/silane treatment for comparative purposes.

The beams were then tested and the fracture toughness values calculated. The results are shown in Table III.

TABLE III

| Process | Metasilicate Concentration (pph) | Silane Concentration (pph) | Critical Load (lbs) | Fracture Toughness (in-lb/ sq-in) | Failure Mode (% coh) |
|---|---|---|---|---|---|
| Vapor Degrease | 0.36 | 5 | 978 | 34.4 | 31 |

TABLE III-continued

| Process | Metasilicate Concentration (pph) | Silane Concentration (pph) | Critical Load (lbs) | Fracture Toughness (in-lb/ sq-in) | Failure Mode (% coh) |
|---|---|---|---|---|---|
| Grit Blast Metasilicate treatment Silane rinse Bond Vapor Degrease Grit Blast Hold 72 hours Metasilicate treatment Silane rinse Bond | 0.36 | 5 | 957 | 33.0 | 19 |
| Conventional Vapor Degrease Grit Blast Hold 72 Hrs Bond | 0 | 0 | 388 | 5.4 | 0 |

Critical loads of 957 to 978 pounds were obtained with the disclosed process compared to 388 pounds for the baseline conventionally cleaned surfaces. Corresponding fracture toughness values ranging from 33 to 34 in-lb/sq-in were calculated for the present invention, an increase of approximately 500 percent over the 5.4 in-lb/sq-in obtained by conventional surface preparation methods, i.e., solvent and abrasive cleaning. Failure mode was 19 to 31 percent cohesive with the disclosed process as compared to 100 percent interfacial failures for conventionally cleaned surfaces.

These data indicate that a metasilicate solution used in conjunction with a silane coupling agent to treat aluminum surfaces makes the bonding surface insensitive to processing timeline prior to bonding. The process significantly improves the resulting bond strength, fracture toughness and failure mode of epoxy adhesive bonds.

Example 2

Ten sets of five ASTM D 3433 tapered double cantilever beam (TDCB) made of 7075-T73 aluminum were contaminated with Conoco HD-2 grease. Five sets of beams were sprayed with a modified commercial semi-aqueous cleaner (Jettacin), and five sets were sprayed with a modified commercial aqueous cleaner (Brulin 815 GD.) The two cleaners contain sodium metasilicate, d-limonene (Jettacin only), and other surfactants, emulsifiers and cleaning agents.

The cleaners were modified by adjusting the sodium metasilicate concentration to 0.36 and 0.07 pph, respectively, to demonstrate solutions within the presently preferred range of metasilicate concentrations. The beams were washed with the cleaners at 135° F. for approximately five minutes and rinsed with a gamma-glycidoxypropyltrimethoxysilane (an epoxy silane) solution at 75° F. for approximately 5 minutes. The silane concentration of the rinse solution was varied from 0.5 to 10 pph to demonstrate solutions within the presently preferred range of silane concentrations defined in Table II. The silane rinse was omitted from one set of beams in each series for comparative purposes.

The cleaned and treated beams were held for 28 hours at a relative humidity of 90% then bonded with staged (near end of working life) Dexter Hysol EA946 epoxy adhesive. The adhesive was cured for a minimum of 36 hours at 135° F. The resulting critical loads, fracture toughness and failure modes are summarized in Tables IV and V.

TABLE IV

| Process | Metasilicate Concentration (pph) | Silane Concentration (pph) | Critical Load (lbs) | Fracture Toughness (in-lb/sq-in) | Failure Mode (% coh) |
|---|---|---|---|---|---|
| Jettacin (modified) Silane rinse Hold 28 hrs Bond | 0.36 | 0.5 | 861 | 26.7 | 62 |
| Jettacin (modified) Silane rinse Hold 28 hrs Bond | 0.36 | 1.0 | 932 | 31.3 | 59 |
| Jettacin (modified) Silane rinse Hold 28 hrs Bond | 0.36 | 5.0 | 977 | 34.4 | 69 |
| Jettacin (modified) Silane rinse Hold 28 hrs Bond | 0.36 | 10.0 | 910 | 29.8 | 50 |
| Baseline Jettacin (modified) Hold 28 hrs Bond | 0.36 | 0 | 497 | 8.9 | 5 |

TABLE V

| Process | Metasilicate Concentration (pph) | Silane Concentration (pph) | Critical Load (lbs) | Fracture Toughness (in-lb/sq-in) | Failure Mode (% coh) |
|---|---|---|---|---|---|
| Baseline Process Brulin 815 GD (modified) Hold 28 hrs Bond | 0.07 | 0 | 483 | 8.4 | 0 |
| Brulin 815 GD (modified) Silane rinse Hold 28 hrs Bond | 0.07 | 0.5 | 874 | 27.6 | 55 |
| Brulin 815 GD (modified) Silane rinse Hold 28 hrs Bond | 0.07 | 1.0 | 902 | 29.4 | 44 |
| Brulin 815 GD (modified) Silane rinse Hold 28 hrs Bond | 0.07 | 5.0 | 873 | 27.6 | 46 |
| Brulin 815 GD (modified) Silane rinse Hold 28 hrs Bond | 0.07 | 10.0 | 956 | 32.9 | 50 |

The baseline process, using metasilicate treatment alone (in commercial cleaners), produced critical loads of 483 to 497 pounds and fracture toughness values of 8.4 to 8.9 in-lb/sq-inch. The disclosed process produced critical loads ranging from 861 to 977 pounds and fracture toughness values ranging from 26.7 to 34.4 in-lb/sq-in with silane concentrations of 0.5 pph and above.

This is a 300 to 400 percent improvement in fracture toughness over that achieved with the baseline, metasilicate only, process and a 400 to 500 percent improvement over that achieved with conventional solvent/abrasive cleaning surface preparation. Failure modes were 40 to 69 percent cohesive with the disclosed process as compared to 95 to 100 percent interfacial failures for the baseline process and 100 percent interfacial failures for conventionally prepared surfaces.

These data demonstrate the ability of the present invention to simultaneously clean and in-situ treat the surface for bonding. These data also illustrate the ability of the present invention to enhance bond strength, fracture toughness and failure mode under adverse process conditions of time delays, relative humidity and staged adhesive.

Example III

In this example, three sets of five ASTM D 3433 tapered double cantilever beams (TDCB) made of 7075-T73 aluminum alloy were cleaned by a conventional process of vapor degreasing with methyl chloroform and grit blasting with zirconium silicate. The clean surfaces were sprayed with a 0.40 pph sodium metasilicate solution at 75° F. for approximately five minutes and rinsed with a 0.24 pph gamma-glycidoxypropyltrimethoxysilane (an epoxy silane) solution at 75° for five minutes. After treatment, each set of beams was held for one, seven, or 14 days at a relative humidity of 90 percent prior to bonding. The beams were bonded with staged (near end of working life) Dexter Hysol EA946 epoxy adhesive and cured for a minimum of 36 hours at 135° F.

A second set of beams was precleaned with the conventional process and held under similar conditions prior to bonding without receiving any metasilicate/silane treatment for comparative purposes. The beams were then tested and the fracture toughness values calculated. The results are show in Table VI.

TABLE VI

| Process | Metasilicate concentration (pph) | Silane concentration (pph) | Hold time (days) | Critical Load (lbs) | Fracture Toughness (in-lb/sq-in) | Failure mode (% coh) |
|---|---|---|---|---|---|---|
| Metasilicate Silane rinse Hold time Bond | 0.40 | 0.24 | 1 | 930 | 31.2 | 18 |
| Metasilicate Silane rinse Hold time Bond | 0.40 | 0.24 | 7 | 958 | 33.0 | 15 |
| Metasilicate Silane rinse Hold time Bond | 0.40 | 0.24 | 14 | 911 | 29.9 | 15 |
| Conventional Vapor degrease Grit blast Hold time Bond | 0 | 0 | 1 | 373 | 5.0 | 0 |
| Conventional Vapor degrease Grit blast Hold time Bond | 0 | 0 | 7 | 372 | 5.0 | 0 |
| Conventional Vapor degrease Grit blast Hold time Bond | 0 | 0 | 14 | 352 | 4.5 | 5 |

Critical loads ranging from 911 to 958 pounds were measured with the present invention as compared to 352 to 373 pounds with the conventional process. Fracture toughness ranging from 30 to 33 in-lb/sq-in were calculated with the metasilicate/silane treated beams. This represented an increase of approximately 500 percent over the 4.5 to 5.0 in-lb/sq-in obtained by conventional solvent and abrasive cleaning surface preparation methods. Failure mode was 15 to 18 percent cohesive with the disclosed process as compared to 100 percent interfacial failures for conventionally cleaned surfaces.

These data indicate that sodium metasilicate used in conjunction with a silane coupling agent on aluminum surfaces will significantly increase the resulting bond strength and that the treated surface is stabilized and insensitive to process time delays of up to 14 days at a relative humidity of 90 percent prior to bonding.

Example IV

One set of five freshly machined ASTM D 3433 tapered double cantilever beams (TDCBs) made of 7075-T73 aluminum alloy were sprayed with a modified commercial semi-aqueous cleaner (Jettacin) containing sodium metasilicate, d-limonene, surfactants, emulsifiers and other cleaning agents. The cleaner was modified by adjusting the sodium metasilicate to 0.36 pph. The beams were sprayed at 135° F. for approximately five minutes and rinsed with a 2.4 pph gamma-glycidoxypropyltrimethoxysilane (an epoxy silane) solution at 75° F. for approximately five minutes. The samples were held for 24 hours at a relative humidity of 90 percent, bonded with staged (near end of working life) Dexter Hysol EA946 epoxy adhesive and cured for a minimum of 36 hours at 135° F.

The samples were tested giving a critical load of 1,039 pounds a fracture toughness of 38.9 in-lb/sq-in and a 49 percent cohesive failure mode.

This demonstrated the capability of the process to clean and treat a freshly machined aluminum surfaces.

Example V

Two sets of five ASTM D 3433 tapered double cantilever beams (TDCBs) and two sets of five tensile adhesion buttons made of 7075-T73 aluminum alloy were contaminated with Conoco HD-2 grease. The beams were sprayed with a modified commercial semi-aqueous cleaner (Jettacin) containing sodium metasilicate, d-limonene, and other surfactants, emulsifiers and cleaning agents. The cleaner was modified by adjusting the sodium metasilicate concentration to 0.36 pph. The beams were sprayed with the modified cleaner at 135° F. for approximately five minutes and rinsed with a 5 pph gamma-glycidoxypropyltrimethoxysilane (an epoxy silane) solution at 75° F. for approximately five minutes. The samples were bonded with Dexter Hysol EA946 epoxy adhesive and cured for a minimum for 36 hours at 135° F. The samples were tested at zero-time and after accelerated aging for four weeks at 120° F. and 70 percent relative humidity.

The results, summarized in Table VII, demonstrate excellent bond durability with no loss in tensile strength, fracture toughness or failure mode degradation.

TABLE VII

| Process | Aging (wks) | Critical Load (lbs) | Fracture Toughness (in-lb/sq-in) | Failure Mode (% coh) | Tensile Strength (psi) | Failure Mode (% coh) |
|---|---|---|---|---|---|---|
| Jettacin (modified) Silane rinse | 0 | 846 | 26.0 | 0 | 3225 | 62 |
| Jettacin (modified) Silane rinse | 4 | 827 | 25.0 | 100 (thin film) | 3404 | 53 |

Example VI

Twenty-Five sets of five ASTM D 3433 tapered double cantilever beams (TDCB) made of 7075-T73 aluminum alloy were cleaned by a conventional process of vapor degreasing with methyl chloroform and grit blasting with zirconium silicate. The clean surfaces were sprayed with a sodium metasilicate solution at 75° F. for approximately five minutes and rinsed with a gamma-glycidoxypropyltrimethoxysilane (an epoxy silane) solution at 75° F. for approximately five minutes. Five sodium metasilicate concentrations (0, 0.05, 0.10, 0.40 and 4.0 pph) and five silane concentrations (0, 0.05, 0.12, 0.24, and 2.44 pph) were used. The treated beams were held for one day at 90 percent relative humidity, bonded with staged (near end of working life) Dexter Hysol EA946 epoxy adhesive and cured for a minimum of 36 hours at 135° F. The resulting critical loads, calculated fracture toughness values and failure modes are summarized in Table VIII.

TABLE VIII

| Metasilicate Concentration (pph) | Silane Concentration (pph) | Critical Load (lbs) | Fracture Toughness (in-lb/sq-in) | Failure Mode (% coh) |
|---|---|---|---|---|
| 0 | 0 | 501 | 9.0 | 2 |
|  | 0.05 | 540 | 10.5 | 5 |
|  | 0.12 | 645 | 15.0 | 2 |
|  | 0.24 | 757 | 20.7 | 6 |
|  | 2.44 | 849 | 25.9 | 10 |
| 0.05 | 0 | 389 | 5.4 | 2 |
|  | 0.05 | 533 | 10.2 | 5 |
|  | 0.12 | 647 | 15.1 | 1 |
|  | 0.24 | 822 | 24.4 | 4 |
|  | 2.44 | 953 | 32.7 | 33 |
| 0.10 | 0 | 430 | 6.7 | 4 |
|  | 0.05 | 567 | 11.6 | 1 |
|  | 0.12 | 663 | 15.8 | 0 |
|  | 0.24 | 795 | 22.8 | 5 |
|  | 2.44 | 915 | 30.1 | 26 |
| 0.40 | 0 | 431 | 6.7 | 0 |
|  | 0.05 | 503 | 9.5 | 0 |
|  | 0.12 | 664 | 15.9 | 1 |
|  | 0.24 | 926 | 30.9 | 35 |
|  | 2.44 | 966 | 33.7 | 25 |
| 4.0 | 0 | 438 | 6.9 | 0 |
|  | 0.05 | 668 | 16.1 | 0 |
|  | 0.12 | 832 | 24.9 | 15 |
|  | 0.24 | 836 | 25.3 | 20 |
|  | 2.44 | 925 | 30.8 | 24 |

Increasing the sodium metasilicate concentration to 4.0 pph with no silane rinse was found to have little effect on bond properties with the fracture toughness ranging from 5.4 to 6.9 in-lb/sq-in and failure modes of 0 to 4 percent cohesive. Increasing the silane primer concentration with no metasilicate pretreatment increased the fracture toughness to as high as 25.9 in-lb/sq-in and the failure mode to 10 percent cohesive with 2.44 pph silane. Combined metasilicate and silane treatment gave the best bond properties with the fracture toughness increasing to as high as 33.7 in-lb/sq-in and failure modes to as high as 35 percent cohesive with concentrations of 0.4 pph sodium metasilicate and 2.44 pph silane.

These data illustrate the synergistic effect of metasilicate and silane coupling agents on adhesive bond properties with optimum conditions achieved at metasilicate concentrations in excess of 0.05 pph and at silane concentrations in excess of 0.24 pph. These data also demonstrate the insensitivity of the process to concentration variations of the treatment and rinse solutions within the range evaluated.

Example VII

One set of five ASTM D 3433 tapered double cantilever beams (TDCB) made of D6AC steel was cleaned using a conventional process of vapor degreasing with methyl chloroform and grit blasting with zirconium silicate. The cleaned beams were then sprayed with a 0.36 pph sodium metasilicate solution at 135° F. for approximately five minutes and rinsed with a 0.53 pph gamma-glycidoxypropyltrimethoxysilane (an epoxy silane) solution at 75° F. for approximately five minutes. The beams were bonded with Dexter Hysol EA946 epoxy adhesive. The adhesive was cured for a minimum of 36 hours at 105° F. A second set of beams was also cleaned with the conventional vapor degreasing and grit blasting process but received no metasilicate or silane post treatment for comparative purposes.

The resulting fracture toughness values, summarized in Table IX, range from 7.8 in-lb/sq-in with conventional surface preparation to 27.6 in-lb/sq-in with the disclosed metasilicate/silane treatment process. This constitutes a 250 percent improvement over conventional surface preparations. Failure modes were 13 percent cohesive for the disclosed process as compared to 5 percent for conventionally prepared surfaces. These data demonstrate the ability to treat steel as well as aluminum surfaces to enhance bonding.

TABLE IX

| Process | Metasilicate Concentration (pph) | Silane Concentration (pph) | Critical Load (lbs) | Fracture Toughness (in-lb/sq-in) | Failure Mode (% coh) |
|---|---|---|---|---|---|
| Disclosure Metasilicate Silane rinse | 0.36 | 0.53 | 1,505 | 27.6 | 13 |
| Conventional Vapor degrease Grit blast | 0 | 0 | 799 | 7.8 | 5 |

Summary

In summary the present invention provides effective and efficient methods of surface preparation and treatment of aluminum in order to provide stable adhesive bonding to aluminum substrates. The methods of the present invention are relatively simple, and use readily available materials. In addition, the materials employed do not present a significant environmental hazard.

Furthermore, the methods of the present invention increase bond strength. In that regard, the methods result in stable bonds which do not significantly degrade over time. While the above discussion is focused on the application of adhesives, the same general results would be expected when using the present invention for the application of paints or other coatings as well.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A process for preparing an aluminum or aluminum alloy surface for bonding comprising the steps of:
    treating an aluminum or aluminum alloy surface with an aqueous solution of a silicate; and
    subsequently treating the surface with an aqueous solution of a silane, which solution is devoid of crosslinking agent of said silane.
2. A process as defined in claim 1 wherein said silicate comprises an alkali metal, alkaline earth metal, amine or quanternary ammonium metasilicate.
3. A process as defined in claim 1 wherein said aqueous silicate solution comprises from about 0.05 pph to about 10.0 pph metasilicate.
4. A process as defined in claim 1 wherein said aqueous silicate solution comprises from about 0.05 pph to about 4.0 pph metasilicate.
5. A process as defined in claim 1 wherein said silane is an organofunctional silane.
6. A process as defined in claim 1 wherein said aqueous silane solution comprises from about 0.24 pph to about 25.0 pph silane.
7. A process as defined in claim 1 wherein said aqueous silane solution comprises from about 0.24 pph to about 10.0 pph silane.
8. A process as defined in claim 1 wherein said silane comprises an organofunctional silane.
9. A process as defined in claim 1 wherein said silane comprises gamma-glycidoxypropyltrimethoxysilane.
10. A process as defined in claim 1 wherein said silane is selected from the group consisting of gamma-glycidoxypropyltrimethoxysilane; gamma-aminopropyltrimethoxysilane; gamma-methacryloxypropyltrimethoxysilane; N-[2-(vinylbenzylamino)ethyl] -3-aminopropyltrimethoxysilane; phentrimethyoxysilane; and [glycidoxy(epoxy)]polyfunctionalmethoxysilane.
11. A process as defined in claim 1 further comprising the step of applying an adhesive to said aluminum or aluminum alloy surface.
12. A process as defined in claim 1 further comprising the step of applying a paint to said aluminum or aluminum alloy surface.
13. A process for preparing an aluminum or an aluminum alloy surface for bonding comprising the steps of:
    treating an aluminum or an aluminum alloy surface with a solution consisting essentially of an aqueous solution of at least one alkali metal metasilicate; and
    subsequently treating the surface with a solution consisting essentially of an aqueous solution of at least one organofunctional silane.
14. A process as defined in claim 13 wherein said aqueous silicate solution comprises from about 0.05 pph to about 10.0 pph metasilicate.
15. A process as defined in claim 13 wherein said aqueous silicate solution comprises from about 0.05 pph to about 4.0 pph metasilicate.
16. A process as defined in claim 13 wherein said aqueous solution silane comprises from about 0.24 pph to about 25.0 pph silane.
17. A process as defined in claim 13 wherein said aqueous solution silane comprises from about 0.24 pph to about 10.0 pph silane.
18. A process as defined in claim 13 further comprising the step of applying an adhesive to said aluminum or aluminum alloy surface.
19. A process as defined in claim 13 further comprising the step of applying a paint to said or aluminum alloy aluminum surface.
20. A method for bonding together a pair of metal surfaces comprising the steps of:
    obtaining at least two pieces of metal, wherein at least one of the metals is an aluminum or an aluminum alloy, each piece of metal having at least one bonding surface;
    treating the metal surfaces to be bonded with an aqueous solution of metasilicate;
    subsequently treating the surfaces to be bonded with an aqueous solution of organofunctional silane, wherein said solution does not contain a crosslinking agent for said silane;
    placing an adhesive on at least one of the metal surfaces to be bonded; and
    bringing the other surface to be bonded into contact with the adhesive.
21. A method as defined in claim 20 wherein said adhesive comprises on epoxy adhesive.
22. A method as defined in claim 20 wherein both of said metal surfaces are aluminum.
23. A process for preparing an aluminum or an aluminum alloy surface for bonding comprising the steps of:
    treating an aluminum or an aluminum alloy surface with an aqueous solution consisting essentially of at least one silicate; and
    subsequently treating the surface with an aqueous solution consisting essentially of at least one silane.
24. A process as defined in claim 23 wherein said aqueous silicate solution comprises from about 0.05 pph to about 10.0 pph metasilicate.
25. A process as defined in claim 23 wherein said aqueous silicate solution comprises from about 0.05 pph to about 4.0 pph metasilicate.
26. A process as defined in claim 23 wherein said aqueous silane solution comprises from about 0.24 pph to about 25.0 pph silane.
27. A process as defined in claim 23 wherein said aqueous silane solution comprises from about 0.24 pph to about 10.0 pph silane.
28. A process as defined in claim 23 further comprising the step of applying an adhesive to said aluminum or aluminum alloy surface.
29. A process as defined in claim 25 further comprising the step of applying a paint to said aluminum or aluminum alloy surface.

* * * * *